(12) United States Patent
Saito

(10) Patent No.: US 8,145,609 B2
(45) Date of Patent: Mar. 27, 2012

(54) INFORMATION PROCESSING DEVICE, INFORMATION PROCESSING SYSTEM, SERIALITY VERIFICATION DEVICE, AND COMPUTER-READABLE MEDIUM

(75) Inventor: Shinichi Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 654 days.

(21) Appl. No.: 12/169,843

(22) Filed: Jul. 9, 2008

(65) Prior Publication Data
US 2009/0030949 A1 Jan. 29, 2009

(30) Foreign Application Priority Data

Jul. 23, 2007 (JP) ................................. 2007-191453
Apr. 16, 2008 (JP) ................................. 2008-107009

(51) Int. Cl.
G06F 7/00 (2006.01)
G06F 17/30 (2006.01)
(52) U.S. Cl. ........................................ 707/697; 707/690
(58) Field of Classification Search .................... 707/697
See application file for complete search history.

(56) References Cited

U.S. PATENT DOCUMENTS

| 2002/0034305 A1 | 3/2002 | Noyama et al. | |
| 2003/0033295 A1* | 2/2003 | Adler et al. | 707/3 |
| 2005/0060055 A1* | 3/2005 | Hallowell et al. | 700/95 |
| 2005/0132196 A1* | 6/2005 | Dietl | 713/176 |
| 2005/0192920 A1* | 9/2005 | Hodge et al. | 707/1 |
| 2006/0098899 A1* | 5/2006 | King et al. | 382/305 |
| 2006/0224895 A1* | 10/2006 | Mayer | 713/176 |
| 2007/0164103 A1* | 7/2007 | Berkowitz et al. | 235/380 |

FOREIGN PATENT DOCUMENTS

JP A-2002-117350 4/2002

OTHER PUBLICATIONS

L.P. Cordella; Document Validation by Signature:a Serial Multi-Expert Approach;1999; IEEE; 601-604.*

* cited by examiner

Primary Examiner — Apu Mofiz
Assistant Examiner — Jermaine Mincey
(74) Attorney, Agent, or Firm — Oliff & Berridge, PLC

(57) ABSTRACT

An information processing device includes a digital-information generating unit, an identifier assigning unit, an attribute setting unit and an electronic signing unit. The digital-information generating unit serially generates pieces of first digital information. The identifier assigning unit assigns different identifiers to the respective pieces of first digital information generated by the digital-information generating unit. The attribute setting unit sets an attribute of each first digital information so as to include the identifier assigned to each first digital information. The electronic signing unit electronically signs each first digital information to which the attribute setting unit sets the attribute including the corresponding identifier.

15 Claims, 11 Drawing Sheets

TALLY IMPRESSION IMAGE A

INFORMATION PROCESSING DEVICE, INFORMATION PROCESSING SYSTEM, SERIALITY VERIFICATION DEVICE, AND COMPUTER-READABLE MEDIUM

CROSS-REFERENCE TO RELATED APPLICATIONS

This application is based on and claims priority under 35 U.S.C. §119 from Japanese Patent Application Nos. 2007-191453 (filed on Jul. 23, 2007) and 2008-107009 (filed on Apr. 16, 2008).

BACKGROUND

1. Technical Field

The invention relates to an information processing device, an information processing system, a computer-readable medium storing an information processing program, a seriality verification device, and a computer-readable medium storing a seriality verification program.

2. Related Art

Recently, Electronic Documents Act has been established in Japan, and digital data generated by an image scanner device, a multifunction device having a scanner function, or the like for scanning paper documents is accepted as documents having competency of evidence like paper documents under a predetermined condition.

To keep Authenticity of the documents, there has been provided a method of electronically signing image data and the like, and/or giving a time stamp of a time certification authority.

SUMMARY

An information processing device includes a digital-information generating unit, an identifier assigning unit, an attribute setting unit and an electronic signing unit. The digital-information generating unit serially generates pieces of first digital information. The identifier assigning unit assigns different identifiers to the respective pieces of first digital information generated by the digital-information generating unit. The attribute setting unit sets an attribute of each first digital information so as to include the identifier assigned to each first digital information. The electronic signing unit electronically signs each first digital information to which the attribute setting unit sets the attribute including the corresponding identifier.

BRIEF DESCRIPTION OF THE DRAWINGS

Exemplary embodiments of the invention will be described in detail below with reference to the accompanying drawings, wherein.

DETAILED DESCRIPTION

Figure 1:
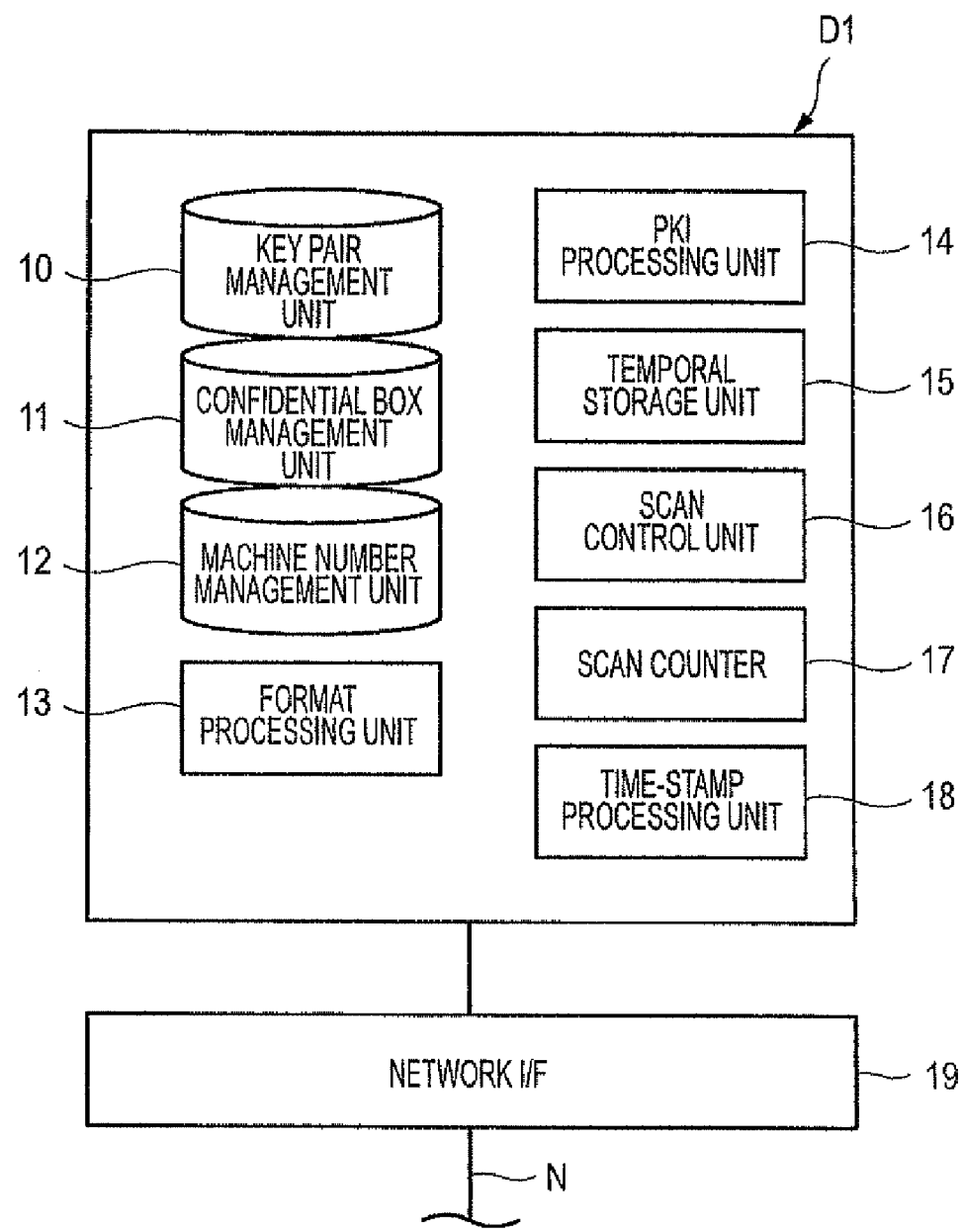
FIG. 1 is a block diagram illustrating the configuration of an information processing device according to a first exemplary embodiment.

Hereinafter, exemplary embodiments of the invention will be described in detail with reference to the accompanying drawings. In the accompanying drawings, the same reference numerals are assigned to similar members. Also, duplicate description will be omitted. Also, it should be noted that since the following description shows the best mode of the invention, the invention is not limited to the best mode.

(First Exemplary Embodiment)

An information processing device D1 according to a first exemplary embodiment as shown in a block diagram of FIG. 1 includes, for example, a multifunction device having a scanner function (as well as a printer function, a facsimile function and the like).

In this exemplary embodiment, a scan counter is built in the information processing device D1. Whenever a paper document is scanned, machine number and a counter value are included in a scanned document and then the scanned document is electronically signed.

The information processing device D1 includes: a key pair management unit 10 that stores a private key and an electronic certificate containing machine number (number assigned to each device) of the device D1; a confidential box management unit 11 that manages a confidential box in which electronic documents (digital data) electronically signed are stored; a machine number management unit 12 that manages the machine number; a format processing unit 13 that converts the electronic documents scanned by a scan control unit 16 (which will be described later) into a certain format such as PDF (Adobe Systems Corp.); a PKI (Public Key Infrastructure) processing unit 14 that calculates a hash value and the like (which will be described in detail later); a temporal storage unit 15 including a RAM that temporally stores various data and the like; the scan control unit 16, which controls a process of scanning paper documents to generate the electronic documents (digital data and image data); the scan counter 17, which counts the number of scanning times whenever a paper document is scanned under the control of the scan control unit 16; a time-stamp processing unit 18 that generates digital data of a time stamp based on time information; and a network interface (I/F) 19 connected to an external personal computer and the like (which will be described later) via a network N such as a LAN.

The 'electronic certificate' managed in the key pair management unit 10 is one that guarantees who owns a public key used in an electronic signature, and the electronic certificate is issued by a third party organization that is called a certificate authority.

Also, a manufacturer of the information processing device D1 and the like may provide an independent certificate authority to issue an electronic certificate.

A person who wants to use an electronic signature first applies for identity verification to the certificate authority, and prepares a key pair (a public key and a private key). Then, the certificate authority issues the electronic certificate to the effect that the person certainly owns this public key.

Generally, a public-key cryptosystem is a cryptosystem configured so that a key (private key) that is used when a message such as an application form is encrypted is different from a key (public key) that is used when a recipient receives and decrypts the encrypted message. The private key used to encrypt a message and the public key used by recipient to decrypt the encrypted message into an original message always constitute one set (one pair), and it is impossible to decrypt the encrypted message into the original message with any key other than the paired key. The combination of the two keys may be referred to as a key pair.

The 'key' described herein is predetermined data that is used when information is encrypted or decrypted.

Figure 11:
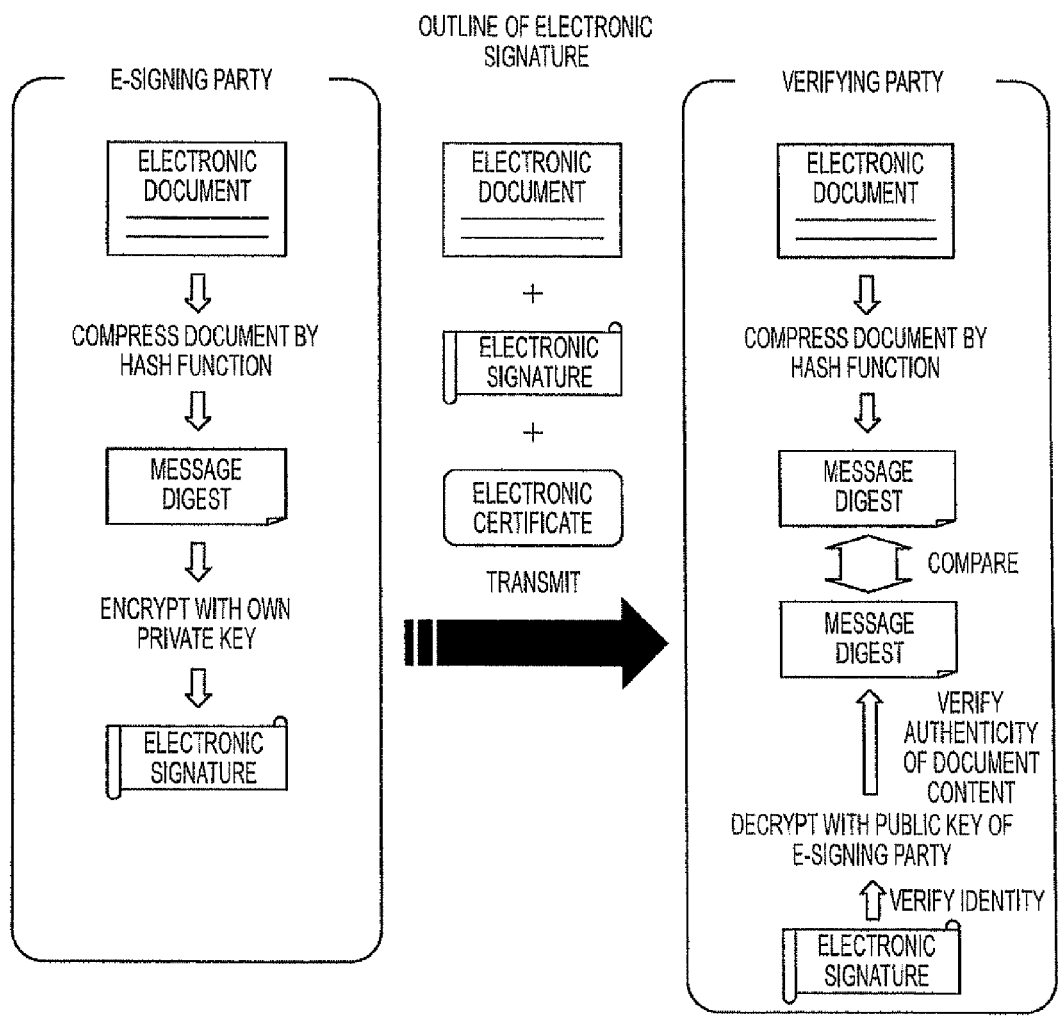
FIG. 11 is an explanatory diagram illustrating an outline of an electronic signature.

Before the exemplary embodiments are described, an outline of the electronic signature will be described with reference to FIG. 11.

An electronic signing party encrypts a message digest with his own private key. The message digest is generated by compressing an electronic document (referred to as a plaintext) with a hash function. This is called 'electronic signature', what is encrypted with a private key can be decrypted with only the other of party's keys, that is, the party's public key.

The electronic document, the electronic signature, and the electronic certificate are formed into one set of data, and are transmitted to a third party such as a verifying party.

On the other hand, an administrative agency, which receives the one set of data, generates a message digest by compressing the received electronic document with the hash function in the same way as the electronic signing party, and compares the thus-generated message digest with the message digest recovered by decrypting the received electronic signature with the electronic signing party's public key. Thereby, it is possible for the administrative agency to verify as to whether or not the message digest is rewritten (falsified) in the course of communication.

Also, in this exemplary embodiment of the invention, it is possible to verify not only as to whether the message digest is rewritten (falsified), but also as to whether or not seriality of the electronic document is maintained as described later.

Also, the hash function is such a function that a message digest can easily be generated from an electronic document, but that it is impossible to recover an original electronic document from the digest, and it is very difficult to generate an identical digest from different electronic documents. Specifically, representative examples of the hash function includes MD5 (a one-way hash function developed by RSA Data Security Corp.) and SHA-1 (Secure Hash Algorithm 1). Also, types of the hash function in this exemplary embodiment of the invention are not limited to specific one.

Figure 2:
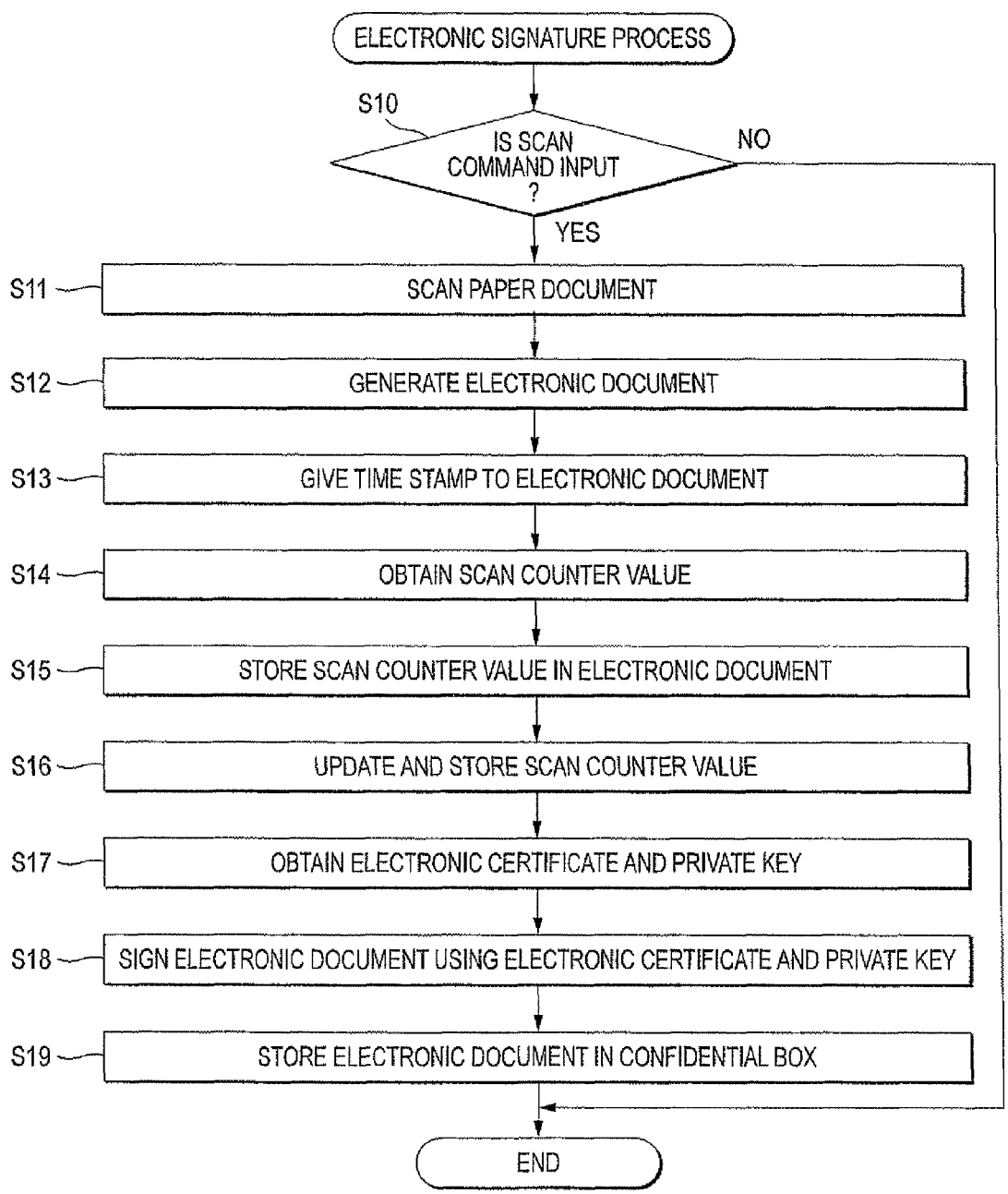
FIG. 2 is a flow chart illustrating a procedure of an electronic signature process executed by the information processing device according to the first exemplary embodiment.

Next, a procedure of an electronic signature process executed by the information processing device D1 according to this exemplary embodiment will be described with reference to a flow chart of FIG. 2.

When this process is started, first in step S10, it is judged as to whether or not a scan command from a user interface and the like is input. If 'No', the process is ended. If 'Yes', the process proceeds to step S11.

In the step S11, the scan control unit 16 controls to scan paper documents (for example, receipts, application forms or certificates).

The scanning operation is performed using an image scanner separately provided from the information processing device D1 or an image scanner (digital-information generating unit) installed in the information processing device D1.

The image scanner is a device that generates image data by reading out a drawing or a photograph from a paper document. Specifically, the image scanner applies light to a target paper document and reads reflection light from the target paper document using an imaging element such as a CCD to convert the target paper document into digital data (scan data).

Next, the process proceeds to step S12. The format processing unit 13 converts the scan data into an electronic document in a predetermined format such as PDF (generates an electronic document). Then, the process proceeds to step S13.

In step S13, the time-stamp processing unit 18 gives a time stamp to the electronic document, and the process proceeds to step S14.

The time stamp is a generic name of a technology for giving 'stamp' accompanied with information of precise time to the electronic document in order to certify that the electronic document exists at that time. The time stamp (stamp) is generated by a reliable third party organization, and the third party organization is called 'TSA (Time-Stamping Authority)'.

Also, the Japanese E-Document Law, which came into effect from Apr. 1 2005, requires to give a time stamp to documents such as patent related documents and electronic stock transaction documents whose creation time is significant, and tax related documents which are necessary to certify the original.

The time stamp is formed in the following order and is used.

(1) A user generates a hash value from a target electronic document, and sends the hash value to the time authority.

(2) The time authority issues a time stamp by adding precise time information to the hash value and encrypting the hash value.

(3) The user embeds the time stamp in the electronic document.

(4) The user verifies the time stamp, if necessary, and checks its creation time and falsification.

Next, in step S14, a counter value is obtained from the scan counter 17, and the process proceeds to step S15. In step S15, the scan count value is stored in the electronic document, and the process proceeds to step S16.

The scan count value may be stored in any area, to be electronically signed, of the electronic document (PDF file or the like).

In step S16, the scan count value is updated (incremented) and is stored in the scan counter 17, and the process proceeds to step S17. In step S17, an electronic certificate and a private key is acquired from the key pair management unit 10, and the process proceeds to S18.

In step S18, the electronic document is electronically signed using the electronic certificate and the private key, and the process proceeds to step S19. In step S19, the electronic document is stored in the confidential box of the confidential box management unit 11, and the process is ended.

The electronic document stored in the confidential box is transmitted to a personal computer or the like through the network interface 19.

Also, the electronic certificate may be a private certificate that is stored in an IC card applicable to the information processing device D1. In this case, machine number is not included in the private certificate and thus, the machine number managed in the machine number management unit 12 is used at the time of electronically signing.

Figure 3:
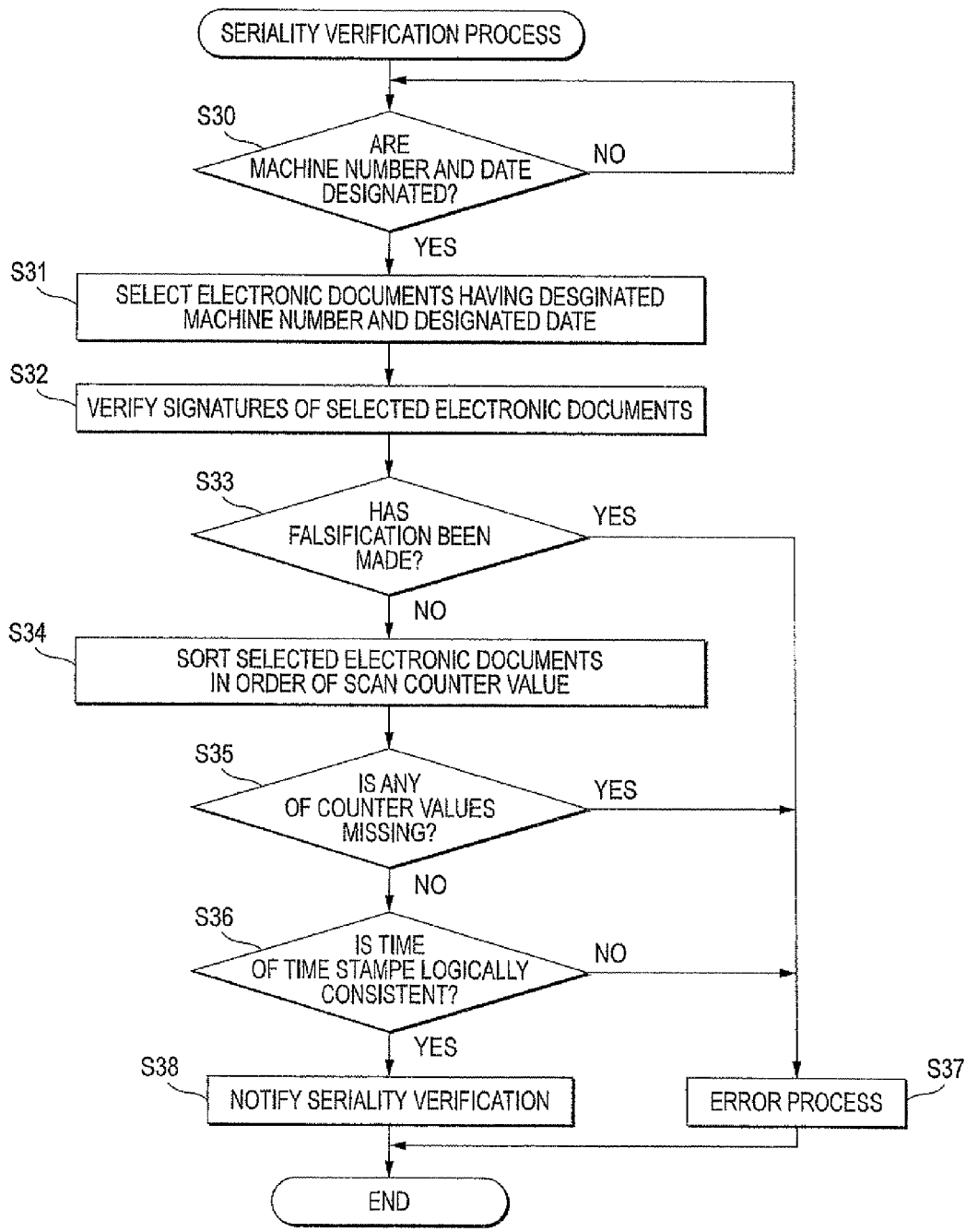
FIG. 3 is a flow chart illustrating a procedure of a seriality verification process.

Next, a procedure of the seriality verification process will be described with reference to a flow chart of FIG. 3.

The seriality verification process is not limited to specific one. The seriality verification process is executed by the personal computer, which is connected to the network N and which can receive the electronic document from the confidential box of the information processing device D1.

The seriality verification process is a process of acquiring machine number, a time stamp and a scan counter value from electronically-signed information of an electronic document, checking for each machine and each date as to whether or not scan counter values are serial, and checking as to whether or not the electronic document is falsified by verifying the electronic signature.

When this process is started, first, in step S30, it is judged as to whether or not machine number and date are designated. If 'No', the process is in standby. If 'Yes', the process proceeds to step S31.

In step S31, electronic documents having the designated machine number and the designated date are selected, and the process proceeds to step 32. In step 32, signatures of the selected electronic documents are verified. Then, in step S33, it is judged as to whether or not any of the electronic documents has been falsified.

If the judging result is 'Yes', the process proceeds to step S37, and an error process of notifying that falsification has been made is executed by using a predetermined error message. Thereafter, the process is ended.

If the judging result is 'No', the process proceeds to step S34, and the selected electronic documents are sorted in order of scan counter value. Then, the process proceeds to step S35, and it is judged as to whether or not any of counter values is omitted (missing).

If the judging result is 'Yes', the process proceeds to step S37. An error process of notifying that "seriality of documents is lost" is executed by using the predetermined error message. Thereafter, the process is ended.

Otherwise, that is, if the judging result is 'No', the process proceeds to step S36, and it is judged as to whether or not time of the time stamp is logically consistent. If the judging result is 'No', the process proceeds to step S37. An error process of notifying that 'seriality of electronic documents is lost' is executed by using a predetermined error message. Thereafter, the process is ended.

If the judging result is 'Yes', the process proceeds to step S38. Notification such as displaying a message to the effect that "seriality of electronic documents is confirmed (verified)." Thereafter, the process is ended.

In this exemplary embodiment, with the process of step S33, it is possible to verify seriality of electronic documents, and certify that no falsification has been made. With this configuration, it is possible to improve reliability of significant data throughout which seriality (e.g., a state where no document is removed and inserted in the course of process) is required, such as various application forms, certificates, and receipts serving as a basis of account information, which are scanning targets.

(Second Exemplary Embodiment)

Figure 5:
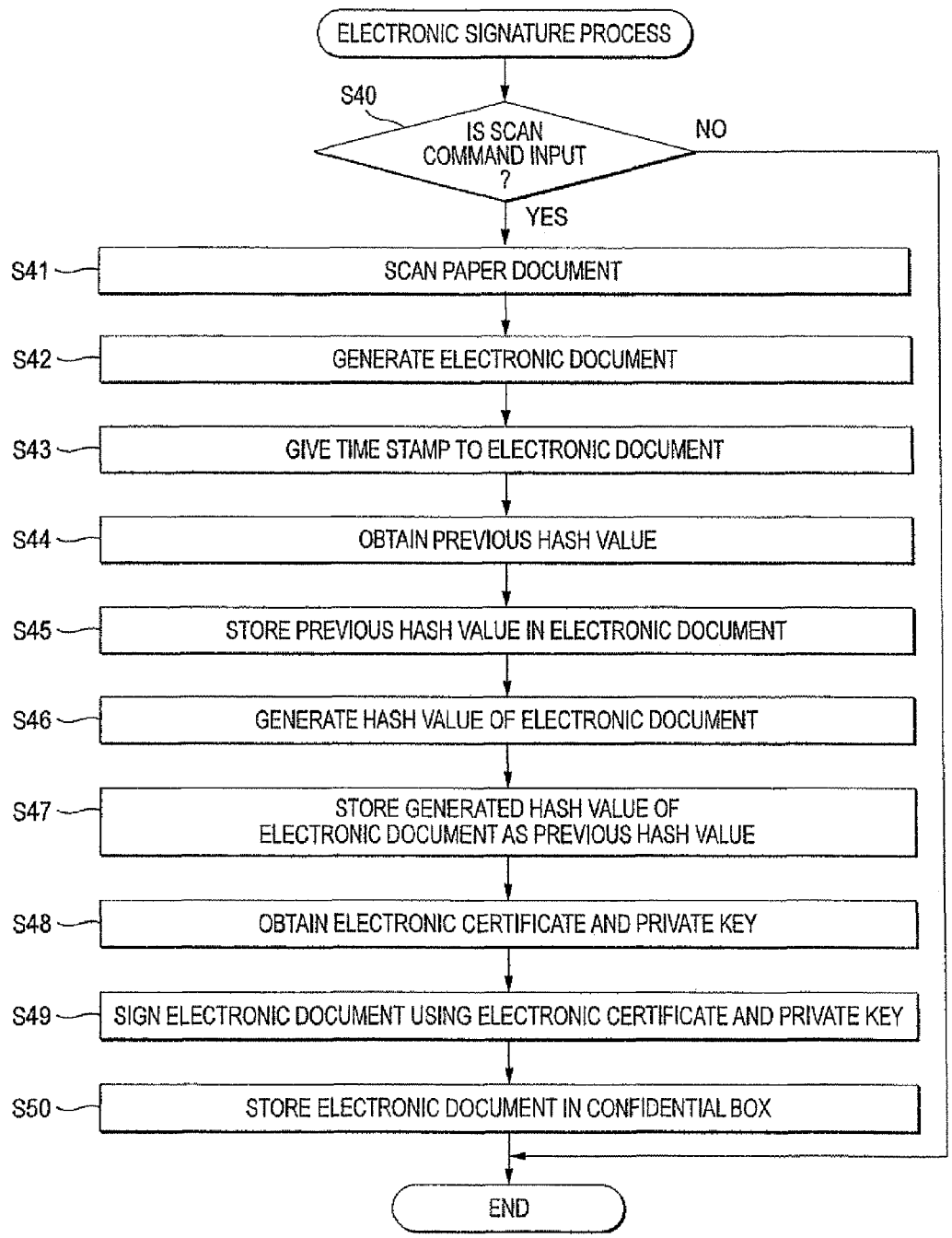
FIG. 5 is a flow chart illustrating a procedure of an electronic signature process executed by the information processing device according to the second exemplary embodiment.
Figure 6:
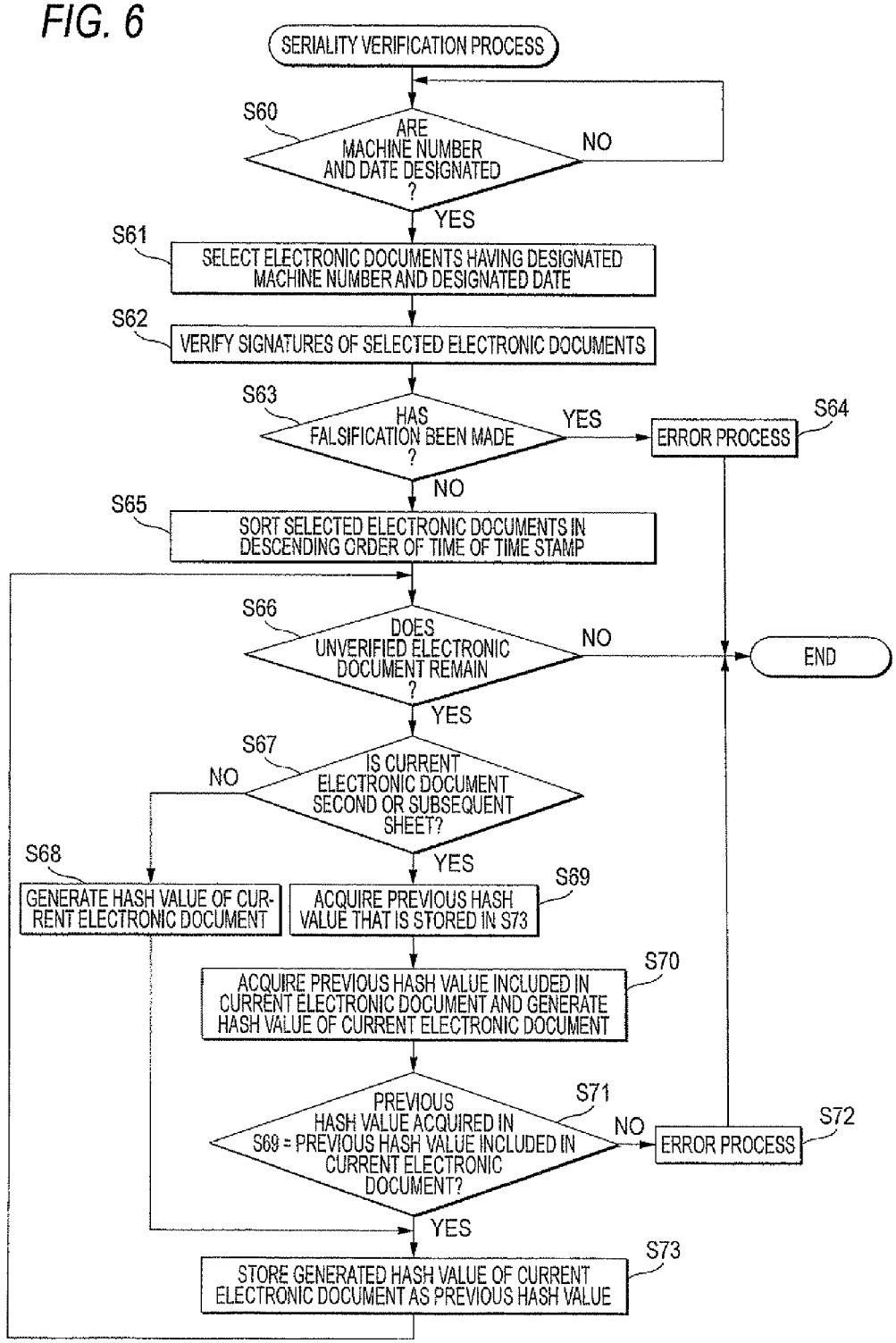
FIG. 6 is a flow chart illustrating a procedure of a seriality verification process.

Next, a second exemplary embodiment of the invention will be described with reference to FIGS. 4 to 6.

The same configuration as the first exemplary embodiment will be referenced by the same reference numerals and signs, and detailed description thereof will be omitted.

Figure 4:
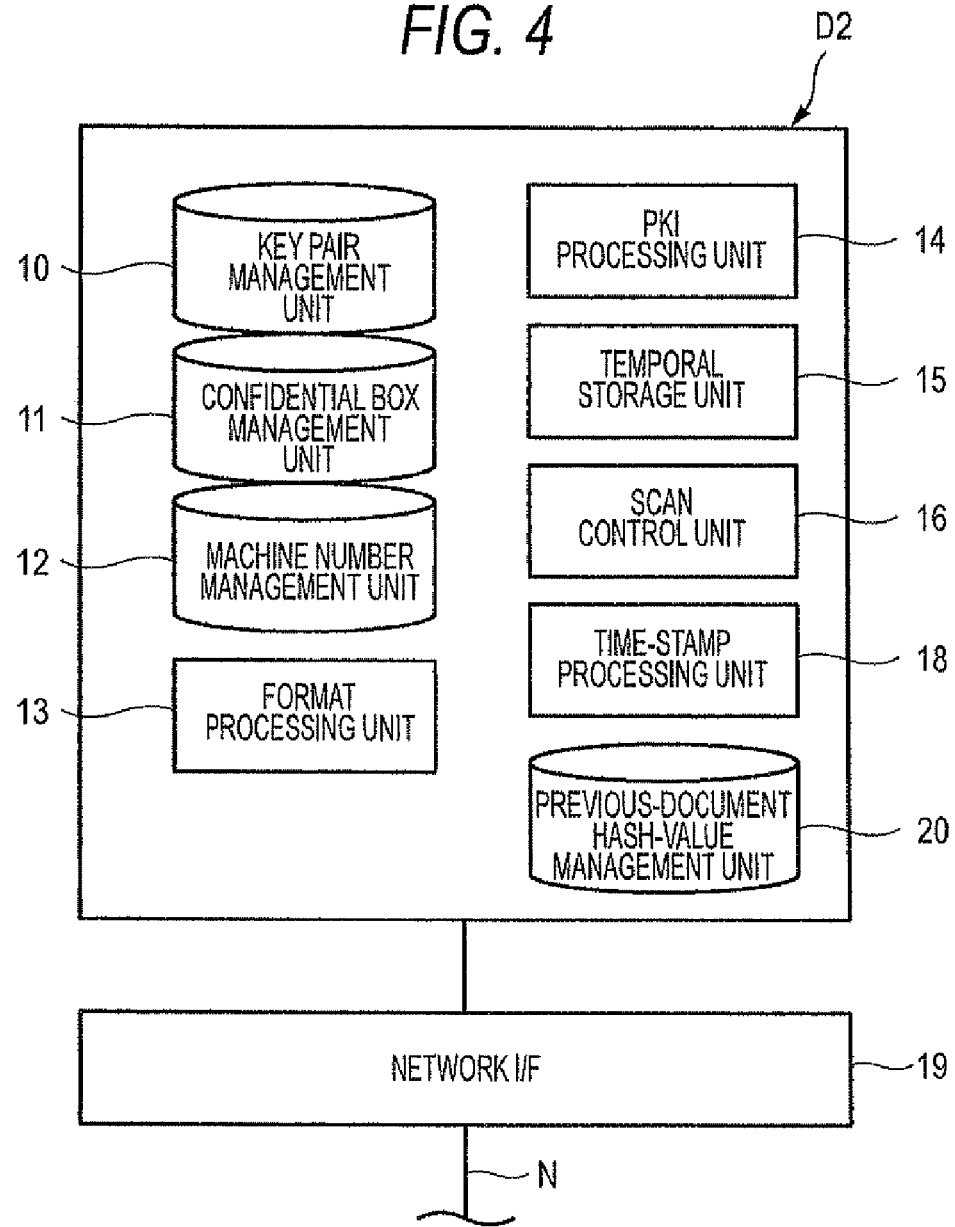
FIG. 4 is a block diagram illustrating the configuration of an information processing device according to a second exemplary embodiment.

An information processing device D2 according to the second exemplary embodiment shown in a block diagram of FIG. 4 includes, for example, a multifunction device which has a scanner function (which has a printer function and a facsimile function as well).

In this exemplary embodiment, a hash value of a scanned document image can be stored in the information processing device itself. Whenever a paper document is scanned, a hash value of a document image that is scanned in the previous time and the machine number are included in the currently scanned document, and then the currently scanned document is electronically signed.

The information processing device D2 is different from the information processing device D1 according to the first exemplary embodiment in that the information processing device D2 includes a previous-document hash-value management unit 20 that manages a hash value of a previous document (a document that is scanned in the previous time in a scanning order) instead of the scan counter 17. The other members are the same as those of the information processing device D1.

The hash value is similar to a fingerprint of an electronic document, and is a value generated by a hash function (MD5, SHA-1 or the like) as described above.

If a hash value of an electronic document is changed before and after transmission, it indicates that the electronic document has been falsified. That is, it is possible to verify as to whether or not falsification has been made, using the property that it is impossible to restore an original document from a hash value and that it is difficult to generate data having the same hash value. Also, it has been known that a length of a hash value as much as 128 to 160 bits is required.

Next, a procedure of an electronic signature process executed by the information processing device D2 according to this exemplary embodiment will be described with reference to a flow chart of FIG. 5.

When this process is started, first in step S40, it is judged as to whether a scan command is input from a user interface or the like. If 'No', the process is ended. If 'Yes', the process proceeds to step S41.

In step S41, the scan control unit 16 controls to scan paper documents (for example, receipts, application forms, and certificates).

The scanning operation is performed using an image scanner separately provided from the information processing device D2 or an image scanner installed in the information processing device D2.

Then, the process proceeds to step S42. The format processing unit 13 converts the scan data into an electronic document in a predetermined format such as PDF (generates an electronic document). Then, the process proceeds to step S43.

In step S43, the time-stamp processing unit 18 gives a time stamp to the electronic document. Then, the process proceeds to step S44.

Next, in step S44, a previous-document hash value (previous hash value: a hash value of a document that is scanned in the previous time in a scanning order) is acquired from the previous-document hash-value management unit 20. The process proceeds to step S45.

In step S45, the previous hash value is stored in the electronic document, and the process proceeds to step S46.

The previous hash value may be stored in any area, to be electronically signed, of the electronic document (PDF file or the like).

In step S46, a hash value of the electronic document including the previous hash value is generated, and the process proceeds to step S47.

In step S47, the generated hash value is stored as a previous hash value in the previous-document hash-value management unit 20, and the process proceeds to step S48.

In step S48, an electronic certificate and a private key are acquired from the key pair management unit 10, and the process proceeds to S49.

In step S49, the electronic document is electronically signed using the electronic certificate and the private key, and the process proceeds to step S50. In step S50, the electronic document is stored in the confidential box of the confidential box management unit 11, and the process is ended.

The electronic document stored in the confidential box is transmitted to the personal computer through the network interface 19.

Also, the electronic certificate may be a private certificate stored in an IC card applicable to the information processing device D2. In this case, the machine number is not included in the private certificate. Thus, the machine number managed in the machine number management unit 12 is used at the time of signing.

Next, a procedure of the seriality verification process will be described with reference to a flow chart of FIG. 6.

The seriality verification process is not limited to specific one. The seriality verification process is executed by the personal computer that is connected to the network N and that can receive the electronic document from the confidential box of the information processing device D2.

The seriality verification process is a process of acquiring machine number, a time stamp and a previous-document hash value from electronically-signed information of an electronic document and verifying for each machine number and each date as to whether or not a hash number and the previous-document hash value are identical with each other.

When this process is started, first in step S60, it is judged as to whether or not machine number and date are designated. Here, if 'No', the process is in standby. If 'Yes', the process proceeds to step S61.

In step S61, electronic documents having the designated machine number and the designated date are selected, and the process proceeds to step 62. In step 62, signatures of the selected electronic documents are verified. Then, in step S63, it is judged as to whether or not any of the electronic documents has been falsified.

If the judging result is 'Yes', the process proceeds to step S64. An error process of notifying a predetermined error message to the effect that some falsification has been made is performed. Thereafter, the process is ended.

If the judging result is 'No', the process proceeds to step S65, and the selected electronic documents are sorted in descending order of time of the time stamp. Then, the process proceeds to step S66, and it is judged as to whether or not an unverified document remains.

If the judging result is 'No', it is assumed that seriality of all the documents is verified, and the process is ended. If the judging result is 'Yes', the process proceeds to step S67, and it is judged as to whether or not an electronic document that is being verified (may be referred to as a current electronic document) is the second or subsequent sheet.

If the judging result is 'No' (that is, the current electronic document is the first sheet), the process proceeds to step S68, and a hash value of the current electronic document is generated. Then, the process proceeds to step S73, and the generated hash value is stored in the personal computer or the like as a previous hash value. Then, the process returns to step S66.

If the judging result in step S67 is 'Yes', the process proceeds to step S69, and the previous hash value (which is stored in the personal computer in step S73) is acquired. Then, the process proceeds to step S70, and a previous hash value included in the current electronic document is acquired. Also, a hash value of the current electronic document is generated. Then, the process proceeds to step S71.

In step 371, it is judged as to whether or not the previous hash value, which is acquired from the personal computer (which is generated and stored in step S68 or S73), is equal to the previous hash value, which is acquired from the current electronic document. If the judging result is 'No', an error process of notifying an error message to the effect that "seriality of the electronic documents is lost" is performed. Thereafter, the process is ended.

If the judging result is 'Yes', the process proceeds to step S73, and the hash value generated (in step S68 or S70) is stored in the personal computer as a previous hash value. Then, the process returns to step S66.

With this configuration, it is possible to improve reliability of significant data throughout which seriality (e.g., a state where no document is removed and inserted in the course of process) is required, such as various application forms, certificates, and receipts serving as a basis of account information, which are scanning targets.

(Third Exemplary Embodiment)

Next, a third exemplary embodiment of the invention will be described with reference to FIGS. 7 to 10.

The same configuration as the first exemplary embodiment and the second exemplary embodiment will be referenced by the same reference numerals and signs, and detailed description thereof will be omitted.

Figure 7:
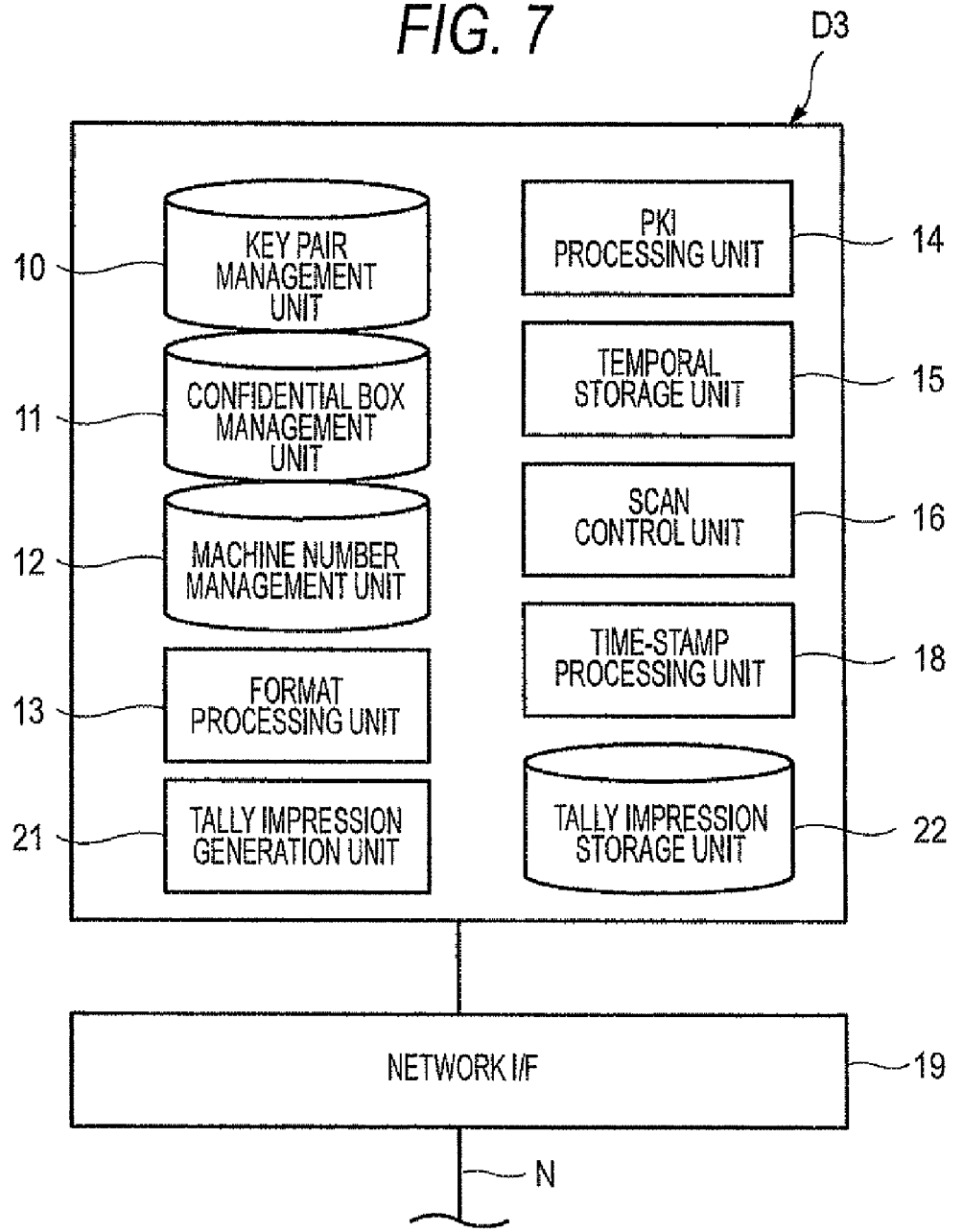
FIG. 7 is a block diagram illustrating the configuration of an information processing device according to the third exemplary embodiment.

An information processing device D3 according to the third exemplary embodiment shown in a block diagram of FIG. 7 includes, for example, a multifunction device which has a scanner function (has a printer function and a facsimile function as well).

In this exemplary embodiment, a tally impression generation unit is built in the information processing device D3, and whenever a paper document is scanned, a scanned image is synthesized with a tally impression, machine number is included in the synthesized scanned image and the synthesized scanned image is electronically signed.

The information processing device D3 is different from the information processing device D2 according to the second exemplary embodiment in that the information processing device D3 includes a tally impression generation unit 21 and a tally impression storage unit 22 instead of the previous-document hash-value management unit 20. The other members are the same as the members of the information processing device D1 and the information processing device D2.

A tally impression image is formed of decryptable predetermined digital information that is to be embedded between electronic documents neighboring to each other in the generation order.

In this exemplary embodiment, the tally impression generation unit 21 generates a seal imprint image having different design whenever a paper document is scanned, and separates each generated seal imprint images into two parts. The separated seal imprint images are called a tally impression image A and a tally impression image B as shown in FIG. 1A. Then, a tally impression image B that is generated in the previous time is acquired from the tally impression storage unit 22, and the current tally impression image A and the acquired tally impression image B of the previous time are synthesized with the currently scanned image (see FIG. 10B).

In the initial state (a state where the first sheet of paper documents is scanned), there is no previously generated tally impression image B. Thus, no tally impression image B of the previous time is synthesized with the scanned image.

Figure 8:
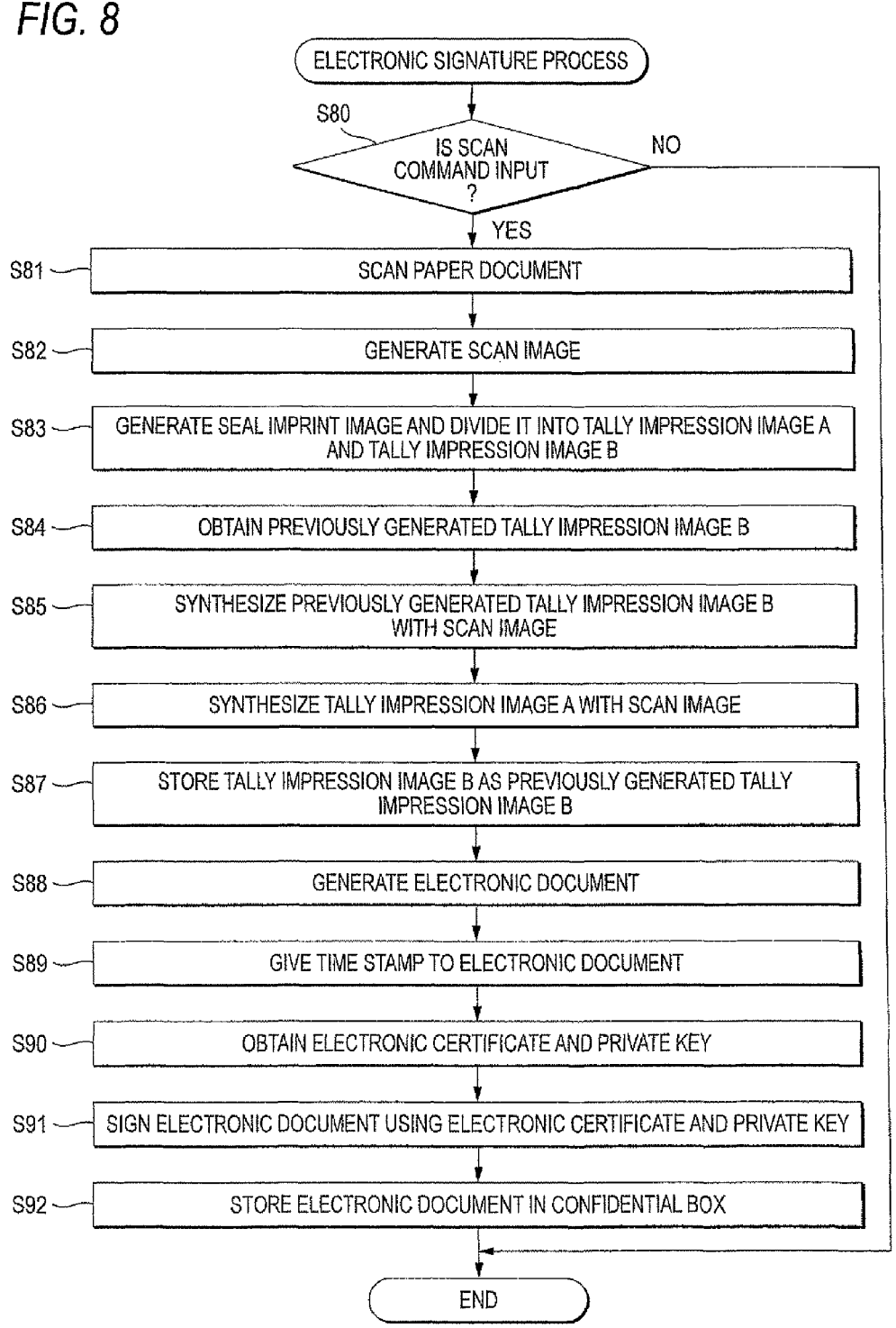
FIG. 8 is a flow chart illustrating a procedure of an electronic signature process executed by the information processing device according to the third exemplary embodiment.

Next, a procedure of an electronic signature process executed by the information processing device D3 according to this exemplary embodiment will be described with reference to a flow chart of FIG. 8.

When this process is started, first in step S80, it is judged as to whether a scan command is input from a user interface or the like. If 'No', the process is ended. If 'Yes', the process proceeds to step S81.

In the step S81, the scan control unit 16 controls to scan paper documents (for example, receipts, application forms, and certificates).

The scanning operation is performed using an image scanner separately provided from the information processing device D3 or an image scanner installed in the information processing device D3.

Next, the process proceeds to step S82, and a scan image is generated. Then, the process proceeds to step S83.

Figure 10A:
FIGS. 10A and 10B are explanatory diagrams illustrating an example of a tally impression (a seal over adjacent two sheets), according to the third exemplary embodiment.

In step S83, the tally impression generation unit 21 generates a seal imprint image, divides the seal imprint image into tally impression images A and B, and stores the tally impression images A and B in the tally impression storage unit 22 (see FIG. 10A).

In step S84, a tally impression image B, which is generated in the previous time, is acquired from the tally impression storage unit 22, and the process proceeds to step S85. In step 85, the tally impression image B, which is generated in the previous time, is synthesized with the scan image, and the process proceeds to step S86.

In step S86, the tally impression image A is synthesized with the scan image, and the process proceeds to step S87. In step S87, the tally impression image B, which is currently generated, is stored as a tally impression image B, which is generated in the previous time, in the tally impression storage unit 22, and the process proceeds to step S88.

In step S88, the format processing unit 13 converts the scan data into an electronic document in a predetermined format such as PDF (generates an electronic document), and the process proceeds to step S89.

In step S89, the time-stamp processing unit 18 gives a time stamp to the electronic document, and the process proceeds to step S90.

In step S90, an electronic certificate and a private key are acquired from the key pair management unit 10, and the process proceeds to S91. In step S91, the electronic document is electronically signed using the electronic certificate and the private key, and the process proceeds to step S92. In step S92, the electronic document is stored in the confidential box of the confidential box management unit 11, and the process is ended.

The electronic document stored in the confidential box is transmitted to the personal computer through the network interface 19.

In addition, the electronic certificate may be a private certificate stored in an IC card and the like applicable to the information processing device D3. In that case, machine number is not included in the private certificate, and thus the machine number managed in the machine number management unit 12 is used at the time of signing.

Figure 9:
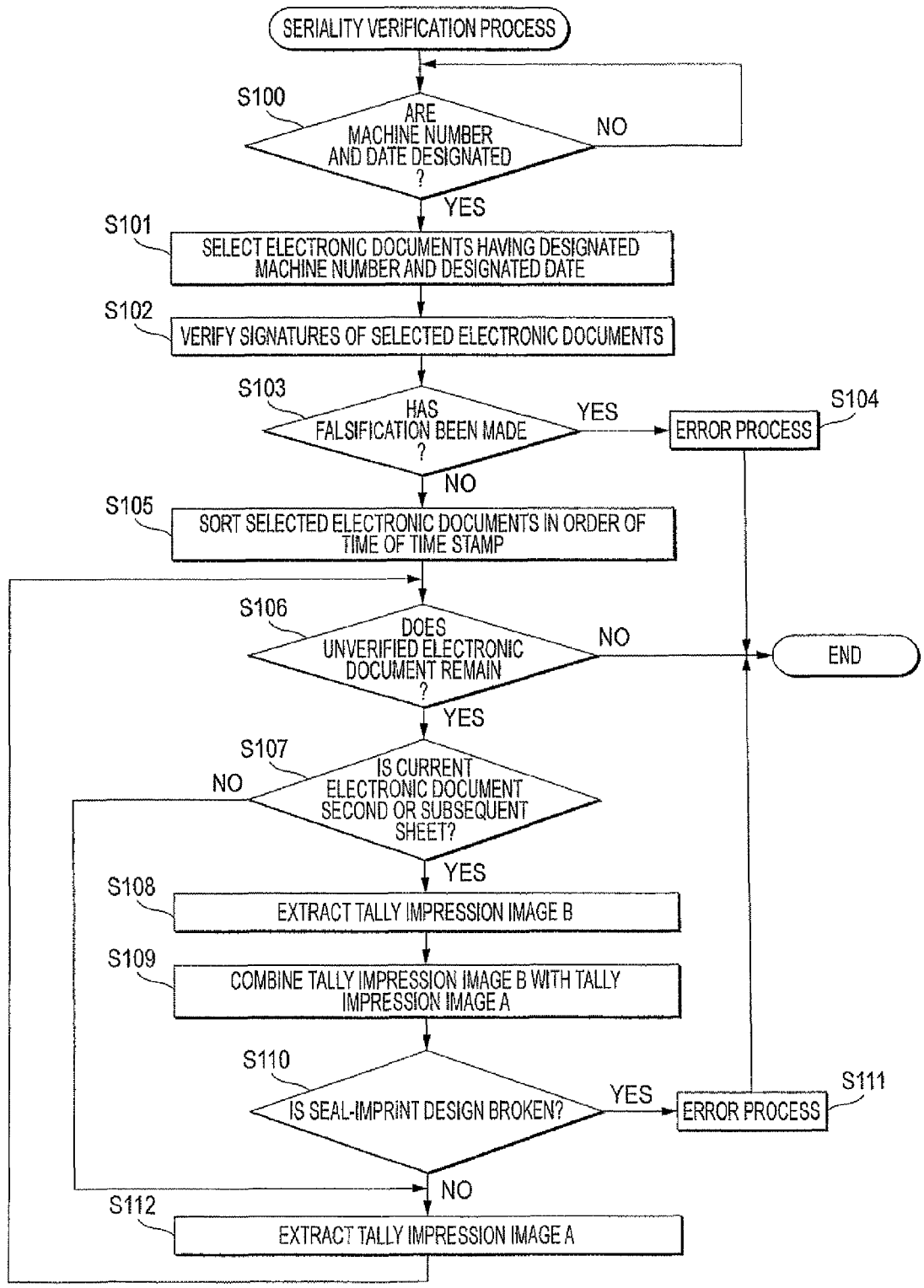
FIG. 9 is a flow chart illustrating a procedure of a seriality verification process.

Next, a procedure of the seriality verification process will be described with reference to a flow chart of FIG. 9.

The seriality verification process is not limited to specific one. The seriality verification process is executed by the personal computer or the like that is connected to the network N and that can receive the electronic documents from the confidential box of the information processing device D3.

The seriality verification process is a process of machine numbers and time stamps from electrically-signed information of electronic documents and selects electronic documents for each machine number and each date.

When this process is started, first in step S100, it is judged as to whether or not machine number and date are designated. If 'No', the process is in standby. If 'Yes', the process proceeds to step S101.

In step S101, electronic documents having the designated machine number and the designated date are selected, and the process proceeds to step S102. In step S102, signatures of the selected electronic documents are verified. In step S103, it is judged as to whether or not any of the electronic documents has been falsified.

If the judging result is 'Yes', the process proceeds to step S104, an error process of notifying a predetermined error message to the effect that falsification has been made is performed. Thereafter, the process is ended after.

If the judging result is 'No', the process proceeds to step S105, and the selected electronic documents are sorted in order of time of the time stamp. Then, the process proceeds to step S106, and it is judged as to whether or not an unverified document remains.

If the judging result is 'No', it is assumed that seriality of the entire documents is verified, and the process is ended. If the judging result is 'Yes', the process proceeds to step S107, and it is judged as to whether or not it is judged as to whether or not an electronic document that is being verified (may be referred to as a current electronic document) is the second or subsequent sheet.

If the judging result is 'No' (that is, the current electronic document is the first sheet), the process proceeds to step S112. The tally impression image A is extracted from the current electronic document, and the process returns to step S106. If the judging result is 'Yes', the process proceeds to step S108. Then, the tally impression image B is extracted from the current electronic document, and the process proceeds to step S109. In step S109, the tally impression image A extracted from the electronic document, which is verified in the previous time, is synthesized with the tally impression image B extracted from the current electronic document, and the process proceeds to step S110.

Figure 10B:
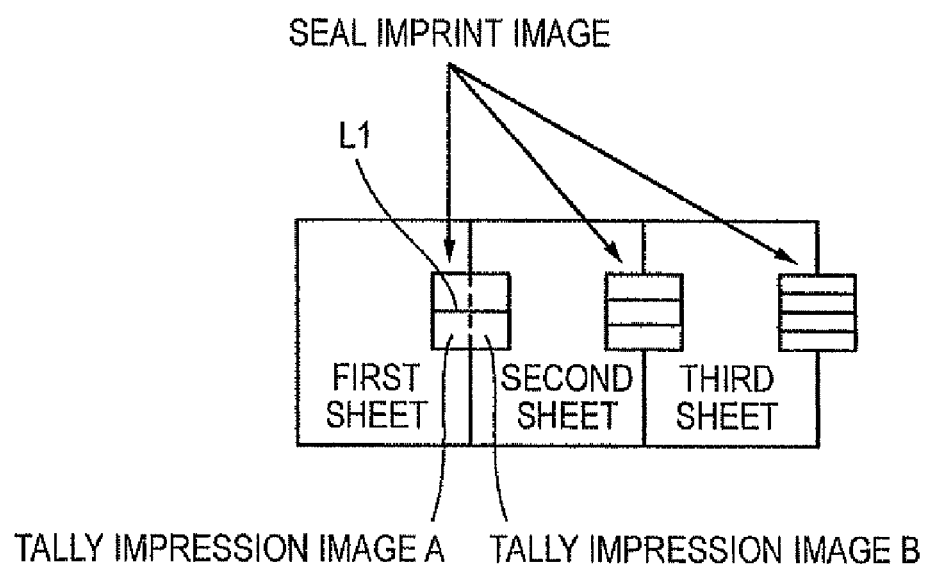

In step S110, it is judged as to whether or not the seal imprint design is broken (for example, checks as to whether or not a transverse black line L1 extends without discontinuation when the tally impression images are synthesized as shown in FIG. 10B). If the judging result is 'Yes', the process proceeds to step S111 and an error process of notifying an error message to the effect that 'seriality of electronic documents is lost' is executed. Thereafter, the process is ended.

If the judging result is 'No', the process proceeds to step S112, and the tally impression image A is extracted from the current electronic document. Then, the process returns to step S106.

With this configuration, it is possible to improve reliability of significant data throughout which seriality (e.g., a state where no document is removed and inserted in the course of process) is required, such as various application forms, certificates, and receipts serving as a basis of account information, which are scanning targets.

Also, according to this exemplary embodiment, when electronic documents are printed, it is possible to visually check the tally impression. Thus, it is advantageous to verify seriality of paper documents.

In addition, when a part of an image is lost due to print margins, it is necessary to print with the entire document image being reduced, so that the part of the image is not lost. Also, it is possible to verify seriality by scanning printed documents, performing skew correction and removing print margins.

In addition, as to another method of verifying as to whether design of a seal imprint image is broken, it is possible to use such a method that an electronic document is electronically signed to include a seal imprint image that is generated in the previous time, the seal imprint image is extracted from the electronic document, and the extracted seal imprint image is compared with a combined seal imprint image.

When the generated seal imprint image is synthesized with a scan image, the print margins are removed by scanning the printed document again. Then, the synthesized seal imprint image is extracted from the electronic document, and is compared with the combined seal imprint image. Thereby, it is possible to perform the verification.

Also, as to another verification method, a hash value of the tally impression image B is embedded in the tally impression image A before the tally impression image A is synthesized with the scan image, and at the time of verification, the hash value of the tally impression image B is obtained, and when the obtained hash value is identical with the hash value of the tally impression image B embedded in the tally impression image A, it is possible to determine that seriality is maintained.

Also, when paper-texture information of a sheet used in the next printing operation is embedded in the tally impression image A at the time of a printing operation, it is possible to verify as to whether or not seriality is maintained, by scanning the printed document again and checking as to whether or not the paper-texture information embedded in the tally impression image A is identical with the paper-texture information of the next document.

The 'paper texture' is ultra microscopic unevenness on a paper surface (may be referred to as a pattern of paper fibers), and this unevenness functions as a unique fingerprint of each paper surface.

Although the detailed descriptions are given based on the exemplary embodiments, it should be considered that the exemplary embodiments disclosed in the application are examples in every respect and the invention is not limited to the disclosed technologies. That is, the technical scope of the invention should not be understood as limited to the specific exemplary embodiments set out above, but should be understood in terms of languages of claims and include all possible modifications which can be embodied within a scope encompassed and equivalents thereof with respect to the features set out in the appended claims.

For example, when a scanned document image is a blank sheet image, the scanned document image may be excluded from targets that will be associated with seriality among documents. Also, this process is applicable not only to removing of the blank sheet, but also to the case where a user stops generation of a scanned-document image file when paper jam occurs in a automatic duplex document feeder.

Also, before the scanned-document image file is generated, the blank sheet may be detected in a memory and be excluded. In this case, the identifier is not assigned to the excluded document.

Also, after the scanned-document image file is generated, the blank sheet may be detected from the scanned-document image file before the identifier is assigned, and be excluded.

Also, after the scanned-document image file is generated and the identifier is assigned, the blank sheet may be detected from the scanned-document image file and be excluded. In this case, the identifier may be used in the next scanned document.

Also, after the scanned-document image file electronically signed are generated so that the identifier is included in the attribute, the blank sheet may be detected from the scanned-document image file electronically signed and be excluded. It is not necessary for the information processing device to execute this process.

Also, multiple signatures may be performed with the attribute including an exclusion flag. In this case, actually, the blank sheet image file may not be removed.

Also, the identifier of the excluded scanned document image may be stored, and the next scanned document image may be electronically signed so that its attribute includes the identifier of the excluded scanned-document image file.

Also, when a program is used, it is possible to provide the program through a network or via a recording medium such as CD-ROM or DVD-ROM.

The information processing device, the information processing system, the computer-readable medium storing the information processing program, the seriality verification device, and the computer-readable medium storing the seriality verification program can be applied to a multifunction device, a laser printer, a facsimile device, and the like.

What is claimed is:

1. An information processing device, including a processor, comprising:

a digital-information generating unit that serially generates, via the processor, pieces of first digital information;

an identifier assigning unit that assigns different identifiers to the respective pieces of first digital information generated by the digital-information generating unit;

an attribute setting unit that sets an attribute of each first digital information so as to include the identifier assigned to each first digital information; and an electronic signing unit that electronically signs each first digital information to which the attribute setting unit sets the attribute including the corresponding identifier, wherein each identifier includes information representing seriality of first digital information neighboring to the first digital information corresponding to each identifier in a generation order, the digital-information generating unit generates the pieces of first digital information of images of a plurality of documents by scanning the plurality of documents, each identifier includes a counting value obtained by counting a number of scanning times whenever the digital-information generating unit scans a document, and each identifier includes second digital information that is decryptable, at least a part of the second digital information being able to be embedded between the first digital information corresponding to each identifier and the first digital information neighboring to the corresponding first digital information in the generation order.

2. An information processing device, including a processor, comprising:

a digital-information generating unit that serially generates, via the processor, pieces of first digital information;

an identifier assigning unit that assigns different identifiers to the respective pieces of first digital information generated by the digital-information generating unit;

an attribute setting unit that sets an attribute of each first digital information so as to include the identifier assigned to each first digital information; and an electronic signing unit that electronically signs each first digital information to which the attribute setting unit sets the attribute including the corresponding identifier, wherein each identifier includes information representing seriality of first digital information neighboring to the first digital information corresponding to each identifier in a generation order, and second digital information that is decryptable, at least a part of the second digital information being able to be embedded between the first digital information corresponding to each identifier and the first digital information neighboring to the corresponding first digital information in the generation, and wherein each identifier includes a counting value obtained by counting a number of scanning times whenever the digital-information generating unit scans a document.

3. The information processing device according to claim 2, wherein the digital-information generating unit generates the pieces of first digital information of images of a plurality of documents by scanning the plurality of documents.

4. The information processing device according to claim 2, wherein each identifier includes time information indicating a time at which the first digital information corresponding to each identifier is generated.

5. The information processing device according to claim 2, wherein each identifier includes one or more hash values that are obtained by applying a predetermined hash function to one or more pieces of first digital information that are earlier than the first digital information corresponding to each identifier in the generation order.

6. An information processing system comprising:
one or more the information processing devices according to claim 2; and
one or more other information processing devices connected to the information processing devices via a communication unit.

7. A seriality verification device comprising:
a verification unit that verifies maintenance of seriality of each first digital information based on each first digital information, which is electronically signed and generated by the information processing device according to claim 2.

8. A non-transitory computer-readable medium storing a program that causes a computer to execute a verification process, the verification process comprising:
verifying maintenance of seriality of each first digital information based on each first digital information, which is electronically signed and generated by the information processing device according to claim 2.

9. The seriality verification device according to claim 7, wherein
the verification unit extracts the identifier from each first digital information, and verifies as to whether or not the extracted identifier is logically consistent, and
when the identifier is logically consistent, the verification unit determines that seriality of each first digital information is maintained.

10. A non-transitory computer-readable medium storing a program that causes a computer to execute a verification process, the verification process comprising:
verifying maintenance of seriality of each first digital information based on each first digital information, which is electronically signed and generated by the information processing system according to claim 6.

11. The non-transitory computer-readable medium according to claim 8, wherein
the verifying includes
extracting the identifier from each first digital information,
verifying as to whether or not the extracted identifier is logically consistent, and
when the identifier is logically consistent, determining that seriality of each first digital information is maintained.

12. A non-transitory computer-readable medium storing a program that causes a computer to execute information processing, the information processing comprising:
serially generating pieces of digital information;
assigning different identifiers to the respective pieces of generated digital information;
setting an attribute of each digital information so as to include the identifier assigned to each digital information; and
electronically signing each digital information to which the attribute including the corresponding identifier is set, wherein
each identifier includes information representing seriality of first digital information neighboring to the first digital information corresponding to each identifier in a generation order,
each identifier includes second digital information that is decryptable, at least a part of the second digital information being able to be embedded between the first digital information corresponding to each identifier and the first digital information neighboring to the corresponding first digital information in the generation order, and
each identifier includes a counting value obtained by counting a number of scanning times whenever the digital-information generating unit scans a document.

13. A seriality verification device comprising:
a verification unit that verifies maintenance of seriality of each first digital information based on each first digital information, which is electronically signed and generated in the information processing system according to claims 6.

14. A seriality verification device comprising:
a verification unit that verifies maintenance of seriality of each digital information based on each digital information, which is electronically signed and generated when the program stored in the non-transitory computer-readable medium according to claim 12 causes the computer to execute the information processing.

15. A non-transitory computer-readable medium storing a program that causes a computer to execute a verification process, the verification process comprising:
verifying maintenance of seriality of each digital information based on each digital information, which is electronically signed and generated when the program stored in the computer-readable medium according to claim 12 causes the computer to execute the information processing.

* * * * *